May 28, 1940.   J. R. DIFFINBAUGH   2,202,445
INSECT DESTROYER
Filed July 10, 1939
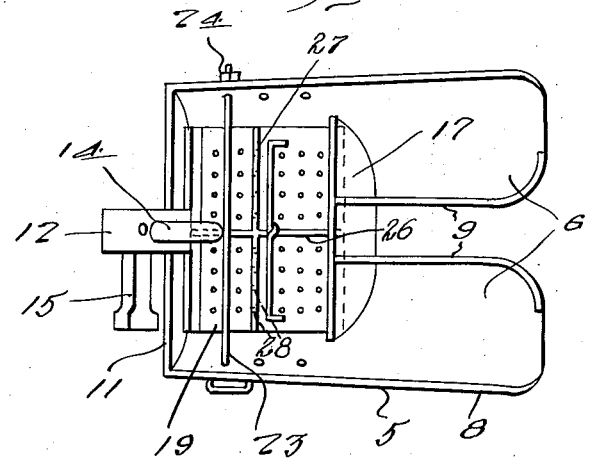
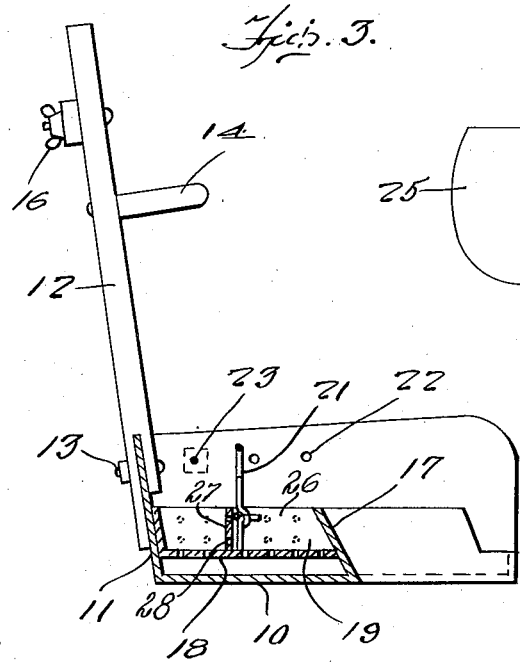
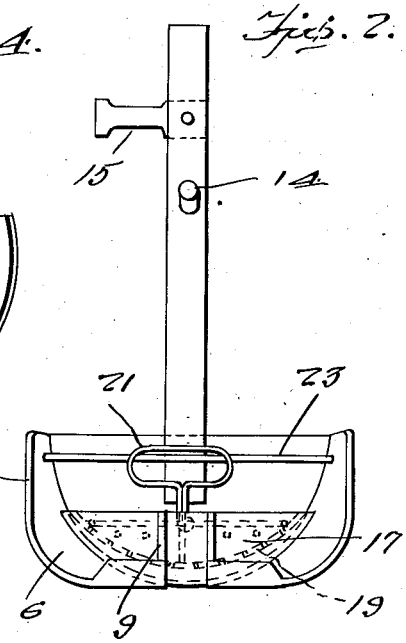
Inventor
J. R. Diffinbaugh
By Clarence A. O'Brien
and Hyman Berman
Attorneys Patented May 28, 1940

2,202,445

UNITED STATES PATENT OFFICE 2,202,445

INSECT DESTROYER

John Rufus Diffinbaugh, Oldtown, Md.

Application July 10, 1939, Serial No. 283,699

3 Claims. (Cl. 43—134)

This application is a continuation in part of my application Serial No. 204,240, filed April 25, 1938.

The present invention relates to insect destroyers and embodies a portable pan adapted to be moved along a row of growing plants and in which pan is carried a quantity of insecticide within which the bugs, insects and the like are deposited by the agitation of the plants during the movement of the pan relative thereto.

One of the important objects of the present invention is to provide an insecticide container having a perforated strainer removably mounted therein and normally immersed in the insecticide and adapted to remove the insects from the pan without disturbing the insecticide, the strainer being provided with longitudinal and transverse partitions to prevent surging of the liquid from one end of the pan to the other while being manipulated.

A further important object is to provide a pan having a bottom provided at its longitudinal edges with upwardly curved side walls and a brace rod connecting the upper edges of the side walls and adapted to adjust the walls relative to each other to enable the free movement of the pan through confined spaces between rows of plants without causing injury thereto.

A further important object is to provide a pan of this character embodying a pair of spaced parallel forwardly extending pan sections having an insecticide container rearwardly thereof, the front edge of the container being provided with a transversely extending partition having a forwardly inclined surface and over which the insects may be driven into the receptacle by the force of air generated by a paddle manipulated by the operator to dislodge the insects from the plant into the pan.

An additional object is to provide a device of this character of simple and practical construction, which is strong and durable, efficient and reliable in operation and otherwise well adapted for the purposes for which the same is intended.

Other objects reside in the details of construction as more fully hereinafter described and claimed, reference being had to the accompanying drawing forming part hereof, wherein like numerals refer to like parts throughout, and in which—

Figure 1 is a top plan view.

Figure 2 is a front elevational view.

Figure 3 is a vertical longitudinal sectional view, and

Figure 4 is a perspective view of the paddle.

Referring now to the drawing in detail, wherein for the purpose of illustration I have disclosed a preferred embodiment of the invention, the numeral 5 designates a pan generally which includes a pair of spaced parallel forwardly extending pan sections 6, the bottom 7 of each of the pan sections curving upwardly at their longitudinal outer side edges to form upstanding side walls 8. The inner edges of the pan sections 6 are provided with relatively short upstanding walls 9, which extend partly across the front of the members as shown in Figure 1 of the drawing.

The rear portion of the sections 6 are provided with a common bottom 10 and the rear edges of the section 6 are joined by an upstanding rear wall 11.

A handle 12 extends upwardly from the upper edge of the rear wall 11 and is connected thereto by means of bolts 13 or the like, the handle having a forwardly extending hand grip 14 and a laterally extending hand grip 15 secured to the upper portion of the handle 12 by a bolt and wing nut 16 which may be removed or loosened and permit the hand grip 15 to swing to either side of the handle 12 to enable the device to be conveniently carried by either the right or left handed person.

The rear portion of the pan 5 is of arcuate shape in cross section, as will be apparent from an inspection of Figure 2 of the drawing, and is provided with a transversely extending partition 17 which inclines upwardly and rearwardly from the bottom of the pan sections 6 and is spaced forwardly from the rear wall 11 to provide an insecticide receptacle 18.

Positioned in the receptacle 18 is a perforated strainer 19 curved transversely to conform to the curvature of the bottom of the pan 5, the edges of the strainer resting upon the inclined walls 8 of the pan to support the bottom of the strainer 20 in a slightly elevated position above the bottom 10 of the pan. A handle 21 extends upwardly from the strainer to facilitate removal of the strainer from the receptacle 18 for the purpose of removing insects which have been deposited therein.

The side walls 8, adjacent their upper rear edges, are provided with openings 22 through which a brace rod 23 is inserted, one end of the brace rod having a nut 24 threaded thereon, by means of which the upper edges of the sides 8 may be drawn into a position toward each other to enable the use of the pan in more restricted places.

In the use of the device, a quantity of insecticide may be placed in the receptacle 18 and the hand grips 14 and 15 used by a person to move the pan in a straddling position along a row of plants, and through the use of the paddle 25 as shown in Figure 4 of the drawing, the branches of the plants may be agitated and the insects caused to drop into the pair of spaced parallel pan sections 6 or into the receptacle 18. The insects which fall into the forward portion of the pan section 6 are forced rearwardly over the inclined partition 17 into the receptacle by use of the paddle 25 to create a force of air for blowing the insects rearwardly of the pan. The strainer 19 being immersed in the insecticide, may readily be removed and the dead insects removed therefrom without disturbing the insecticide.

In order to prevent surging of the insecticide in the receptacle 18 while the device is being carried the strainer 19 is provided with a longitudinal upstanding baffle or dam 26 and a transverse upstanding baffle or dam 27, the latter being perforated as shown at 28. The baffles are crossed at an intermediate point as shown in Figure 1.

It is believed the details of construction and use of the device will be readily understood from the foregoing without further detailed explanation .

What is claimed is:

1. An insect destroyer comprising a pan including a pair of forwardly extending spaced parallel pan sections adapted to straddle a plant row, an insecticide receptacle rearwardly of said pan sections, a transversely extending partition separating the pan sections from the receptacle, said partition being inclined upwardly and rearwardly to facilitate passage of the insects from the pan sections into the receptacle.

2. An insect destroyer comprising a pan including a pair of forwardly extending spaced parallel pan sections adapted to straddle a plant row, each pan including a bottom and an outer side wall, the latter being connected by a rear wall, the inner edges of said pan having an upstanding flange extending partly along the front edge of the pan, an insecticide receptacle rearwardly of said pan sections, a transversely extending partition separating the pan sections from the receptacle, said partition being inclined upwardly and rearwardly to facilitate passage of the insects from the pan sections into the receptacle, and a handle extending upwardly from the rear edge of the pan.

3. An insect destroyer comprising a pan including a pair of forwardly extending spaced parallel pan sections adapted to straddle a plant row, an insecticide receptacle rearwardly of said pan sections, a transversely extending partition separating the pan sections from the receptacle, said partition being inclined upwardly and rearwardly to facilitate passage of the insects from the pan sections into the receptacle, a strainer removably carried in said receptacle, and upstanding transverse and longitudinal baffles in said strainer adapted to prevent surging of the insecticide in the receptacle.

JOHN RUFUS DIFFINBAUGH.